(12) United States Patent
Ba-abbad et al.

(10) Patent No.: US 8,999,253 B2
(45) Date of Patent: Apr. 7, 2015

(54) METHOD AND APPARATUS FOR INCINERATING WASTE

(75) Inventors: Mazen A. Ba-abbad, Riyadh (SA); Ahmed Mohammed Alabdulkader, Riyadh (SA); Ali Abdullah Aljaloud, Riyadh (SA)

(73) Assignee: King Aboulaziz City for Science and Technology (KACST), Riyadh (SA)

( * ) Notice: Subject to any disclaimer, the term of this patent is extended or adjusted under 35 U.S.C. 154(b) by 312 days.

(21) Appl. No.: 13/028,171

(22) Filed: Feb. 15, 2011

(65) Prior Publication Data

US 2012/0204613 A1    Aug. 16, 2012

(51) Int. Cl.

| | |
|---|---|
| F23G 5/00 | (2006.01) |
| B09B 3/00 | (2006.01) |
| C05F 9/02 | (2006.01) |
| F23G 5/02 | (2006.01) |
| B22F 1/00 | (2006.01) |
| B22F 9/14 | (2006.01) |
| B82Y 30/00 | (2011.01) |

(52) U.S. Cl.
CPC ... *C05F 9/02* (2013.01); *B09B 3/00* (2013.01); *F23G 5/00* (2013.01); *F23G 5/02* (2013.01); *F23G 2201/701* (2013.01); *B22F 1/0022* (2013.01); *B22F 9/14* (2013.01); *B22F 2998/10* (2013.01); *B22F 2999/00* (2013.01); *B82Y 30/00* (2013.01)

(58) Field of Classification Search
None
See application file for complete search history.

(56) References Cited

U.S. PATENT DOCUMENTS

| | | | | |
|---|---|---|---|---|
| 3,340,044 | A | * | 9/1967 | MacAfee et al. ............... 75/502 |
| 5,322,547 | A | * | 6/1994 | Nagel et al. .................... 75/414 |
| 5,564,351 | A | * | 10/1996 | Wagner ......................... 110/346 |

* cited by examiner

*Primary Examiner* — Jennifer A Leung
(74) *Attorney, Agent, or Firm* — Timberline Patent Law Group PLLC

(57) ABSTRACT

The invention provides a method and apparatus for incinerating waste, wherein the waste is one or more of an organic waste and an inorganic waste. The apparatus includes a grinder for grinding a mixture of the waste and calcium carbonate. The ground mixture is then fed to a molten metal bath contained within a crucible. Thereafter, a heating member configured proximal to the crucible combusts the mixture of the waste and the calcium carbonate to form one or more of slag and one or more acidic gases. On combustion, the one or more acidic gases are neutralized by calcium hydroxide produced as a result of combusting the calcium carbonate. Additional metal compounds usable as fertilizers are also produced in response to reacting with the one or more acidic gases.

12 Claims, 5 Drawing Sheets

US 8,999,253 B2

METHOD AND APPARATUS FOR INCINERATING WASTE

FIELD OF THE INVENTION

The invention generally relates to incinerating waste, wherein the waste is one or more of organic waste and inorganic waste. More specifically, the invention relates to a method and apparatus for incinerating waste thereby producing metal compounds that can be used as fertilizers.

BACKGROUND OF THE INVENTION

Incineration has long been considered as a fundamental approach for waste disposal. Typical waste incinerators tend to be large in size and cater to disposal of large quantities of industrial waste or garbage. However, owing to the large size and complexity of the present waste incinerators, cleaning and maintenance of these waste incinerators is difficult. Additionally, present waste incinerators are designed assuming a consistent composition of the waste and are not able to adjust to sudden or sporadic variations in the composition of waste.

Further, known processes of incinerating waste produce acidic gases such as, nitrogen oxide and phosphorus oxide as a byproduct of burning the waste. These acidic gases react with moisture present in the waste to form corrosive acids such as, nitric acid and phosphoric acid that leads to corrosion of the waste incinerator. Further, the byproducts formed as a result of burning the waste need to be further chemically treated in order to make them useful as fertilizers.

Therefore, there is a need for a compact, non-corrosive method and apparatus for incinerating waste. Further, there is a need of an apparatus that can provide byproducts that does not require additional chemical treatment of these byproducts formed as a result of the incineration.

BRIEF DESCRIPTION OF THE FIGURES

The accompanying figures, where like reference numerals refer to identical or functionally similar elements throughout the separate views and which together with the detailed description below are incorporated in and form part of the specification, serve to further illustrate various embodiments and to explain various principles and advantages all in accordance with the present invention.

Figure 1:
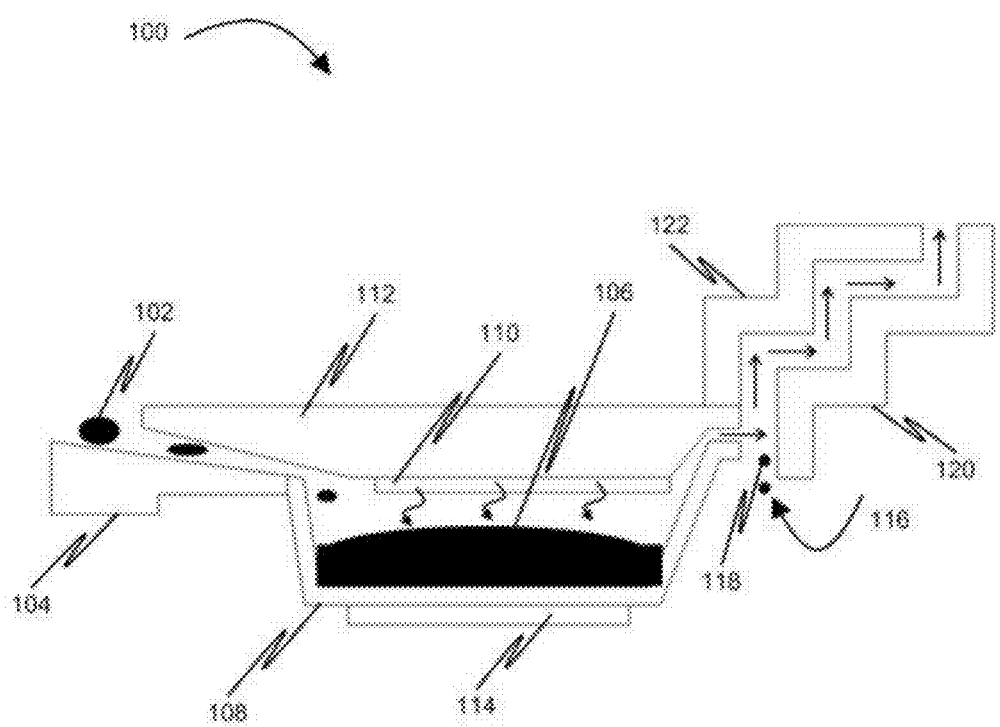
FIG. 1 illustrates a schematic representation of an apparatus for incinerating waste in accordance with an embodiment of the invention.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the invention.

DETAILED DESCRIPTION OF THE INVENTION

Before describing in detail embodiments that are in accordance with the invention, it should be observed that the embodiments reside primarily in combinations of method steps and apparatus components related to a method and apparatus for incinerating waste, wherein the waste is one or more of an organic waste and an inorganic waste. Accordingly, the apparatus components and method steps have been represented where appropriate by conventional symbols in the drawings, showing only those specific details that are pertinent to understanding the embodiments of the invention so as not to obscure the disclosure with details that will be readily apparent to those of ordinary skill in the art having the benefit of the description herein.

In this document, relational terms such as first and second, top and bottom, and the like may be used solely to distinguish one entity or action from another entity or action without necessarily requiring or implying any actual such relationship or order between such entities or actions. The terms "comprises," "comprising," or any other variation thereof, are intended to cover a non-exclusive inclusion, such that a process, method or apparatus that comprises a list of elements does not include only those elements but may include other elements not expressly listed or inherent to such process, method or apparatus. An element proceeded by "comprises . . . a" does not, without more constraints, preclude the existence of additional identical elements in the process, method or apparatus that comprises the element.

Generally speaking, pursuant to various embodiments, the invention provides a method and apparatus for incinerating waste, wherein the waste is one or more of an organic waste and an inorganic waste. The apparatus includes a grinder for grinding a mixture of the waste and calcium carbonate to reduce the size of the particles of the mixture, a molten metal bath contained within a crucible for receiving the mixture from the grinder, and a heating member configured proximal to the crucible for combusting the mixture of the waste and the calcium carbonate. The combustion of the mixture of the waste and the calcium carbonate produces one or more of one or more acidic gases and slag. The slag includes calcium oxide, wherein the calcium oxide reacts with moisture present in the waste to produce calcium hydroxide. Thereafter, one or more of the molten metal and the calcium hydroxide facilitates one or more of neutralizing the one or more acidic gases and generating metal compounds usable as fertilizers in response to reacting with the one or more acidic gases.

FIG. 1 illustrates a schematic representation of an apparatus 100 for incinerating waste in accordance with an embodiment of the invention. The waste may be one or more of an organic waste and an inorganic waste. For example, the waste may include one or more of human waste, animal waste, plant waste, and plastic waste. The human waste, the animal waste and the plant waste may include moisture, carbohydrates and other organic materials along with elements such as but not limited to, nitrogen, potassium and phosphorous. The plastic waste may include moisture, hydrocarbons and other elements. Apparatus 100 includes a feed inlet for guiding a mixture of the waste and calcium carbonate 102 (hereinafter referred to as, mixture 102) to a grinder 104. Grinder 104 then grinds mixture 102 to reduce the size of the particles of the mixture. In this case, mixture 102 is ground to increase a surface area of mixture 102 to enable efficient incineration of mixture 102. The functioning of grinder 104 is further explained in conjunction with FIG. 2.

On grinding mixture 102, mixture 102 is fed to a molten metal bath 106 present within a crucible 108. Mixture 102 may be fed into molten metal bath 106 in response to a centrifugal force generated by grinder 104. Molten metal bath 106 may include, but is not limited to, molten steel and molten iron. Thereafter, air is allowed to enter into apparatus 100 through one or more air inlets and subsequently mixture 102 is combusted by supplying heat from a heating member 110 configured proximal to crucible 108. In addition to combusting mixture 102, heating member 110 may maintain the temperature within apparatus 100 between the melting point and the boiling point of the metal. The temperature is maintained at this level in order to keep molten metal bath 106 in the molten form. For example, molten metal bath may include molten steel. In this case, a heating member may maintain the temperature at around 1375° C. The temperature 1375° C. is the melting point of steel. Further, the heat dissipated by molten metal bath 106 may be used to reduce the amount of moisture in mixture 102 prior to feeding mixture 102 to molten metal bath 106.

In an embodiment, heating member 110 may be placed on the bottom surface of an upper cover 112 as illustrated in FIG. 1. It will be apparent to one skilled in the art that placement of heating member 110 is not limited to that illustrated in FIG. 1 but may be arranged in any fashion proximal to molten metal bath 106 for heating molten metal bath 106. Further, in an embodiment, heating member 110 may include a coiled tungsten wire having high resistance. Thus, when electricity is passed through the coiled tungsten wire, the resistance of the tungsten wire results in production of heat to maintain the metal in the molten state. In another embodiment, heating member 110 may include one or more air nozzles through which one or more gases are passed. The one or more gases are burnt with air supplied through the one or more air inlets to generate heat. However, heating member 110 may be any other heating device known in the art. Heating member 110 may be supplied power using a power source. The power source may be an external power source or an internal power source.

Once mixture 102 is combusted, one or more of a slag and one or more acidic gases are produced. The one or more acidic gases may include but are not limited to, nitrogen oxide and phosphorus oxide. These acidic gases may react with water vapor to form one or more acids. The water vapor is formed from the moisture present in the waste. The one or more acids may include but are not limited to, nitric acid, sulfuric acid, phosphoric acid and hydrochloric acid. For example, nitrogen oxide and phosphorus oxide may react with the water vapor to form nitric acid and phosphoric acid. Thereafter, the one or more acids react with the metal present in molten metal bath 106 to form metal compounds. The metal compounds thus formed may include, but are not limited to, metal nitrates and metal phosphates. For example, the metal compounds may include iron nitrate and iron phosphate. These metal compounds may be used directly as fertilizers. Further, hydrogen may be also released in response to this reaction between the one or more acidic gases and the metal. In an embodiment, the hydrogen gas released may be injected through the one or more air nozzles and burnt in air to produce heat.

In an embodiment, the one or more acidic gases may be neutralized by reacting with calcium hydroxide formed in response to combustion of the calcium carbonate present in mixture 102. During combustion of calcium carbonate, calcium oxide and carbon dioxide may be formed. The calcium oxide forms a slag layer above molten metal bath 106 and absorbs moisture from the waste to produce heat and calcium hydroxide. Further, the calcium oxide may absorb carbon dioxide at temperatures below 900° C. to form calcium carbonate. The calcium carbonate may then react with the one or more acidic gases to form calcium compounds. For example, calcium carbonate so formed reacts with nitric acid and phosphoric acid to produce calcium compounds such as, calcium nitrate and calcium phosphate respectively.

Further, other elements present in the waste may react with the one or more acidic gases to form other compounds. For example, potassium present in the waste absorbs moisture and forms potassium hydroxide. Potassium hydroxide may have a high boiling point and a density lower than the molten metal. The lower density of the potassium hydroxide causes the potassium hydroxide to collect in the slag layer. In the slag layer, the potassium hydroxide reacts with the one or more acids such as, nitric acid, sulfuric acid, phosphoric acid and hydrochloric acid to form potassium compounds such as, potassium nitrate, potassium sulfate, potassium phosphate, and potassium chloride, respectively. The iron nitrate, calcium nitrate, iron phosphate, calcium phosphate and the potassium compounds formed as a result of combusting the mixture of the waste and the calcium carbonate may be removed in the form of slag through one or more access holes. These compounds formed are then used directly as plant fertilizers without requiring further chemical treatment.

Further, due to incomplete combustion of mixture 102, unburned carbon particles may be formed. These unburned carbon particles may settle in molten metal bath 106. In such a scenario, molten metal bath 106 may be stirred by one or more stirrers such as, a stirrer 114 to enable unburned carbon particles from mixture 102 to melt in molten metal bath 106. The one or more stirrers may include, but are not limited to, a mechanical stirrer and a magnetic stirrer. The unburned carbon particles are then caused to leave molten metal bath 106 as carbon dioxide by heating molten metal bath 106 to a high temperature. On heating, the unburned carbon particles extract oxygen from the slag layer to form carbon dioxide. For example, unburned carbon particles may react with an iron oxide layer formed on the slag layer to form carbon dioxide. The one or more stirrers may be driven by the one or more motors (not shown in FIG. 1) causing the one or more stirrers to rotate thereby stirring molten metal bath 106.

During combustion of mixture 102, one or more high melting point metals and one or more low melting point metals may be generated. The one or more high melting point metals present in the waste may be collected in molten metal bath 106. The one or more high melting point metals may include metals having a melting point substantially higher than the melting point of the metal in molten metal bath 106. The one or more high melting point metals may include, but are not limited to, copper, lead and zinc. These metals remain in the solid form and are collected in molten metal bath 106. Accordingly, the one or more high melting point metals may be extracted and processed.

The one or more low melting point metals present in the waste may evaporate from crucible 108. This process of evaporation of the one or more low melting point metals may occur in response to maintaining the temperature within crucible 108 substantially higher than the boiling point of the one or more low melting point metals. The one or more low melting point metals may include, but are not limited to, mercury and cadmium. These metals may have a boiling point substantially lower than that of the metal in molten metal bath 106. The low melting point metals are removed from crucible 108 in the gaseous form through one or more outlets such as, outlet 116. Thereafter, the one or more low melting point metals are condensed to form condensed low melting point metals 118 by one or more of a heat exchanger 120 and an insulator 122. In an embodiment, insulator 122 may be replaced by a heat exchanger for efficient cooling of the one or more low melting point metals. In this case, insulator 122 may be a removable insulator. Condensed low melting point metals 118 thus formed may be then collected in a low melting point metal bath (not shown in FIG. 1) and processed.

Further, referring back to the combustion exhaust gases formed because of combustion of mixture 102, these combustion exhaust gases are cooled by one or more of heat exchanger 120 and insulator 122 before exiting from apparatus 100. The combustion exhaust gases are cooled in order to prevent formation of dioxins. In an embodiment, heat exchanger 120 may be filled with distilled boiler grade water. The distilled boiler grade water absorbs the heat from the exhaust combustion gases and boils out into steam. This steam may then be used to run a turbine to generate electricity for any other purpose known in the art.

Alternatively, the combustion exhaust gases may be fed through one or more air inlets to heating member 110 to produce heat within apparatus 100. Thus, by reusing the hot combustion exhaust gases to generate heat, power consumption associated with apparatus 100 is reduced. Apparatus 100 may also include one or more water scrubbers (not shown in FIG. 1) for filtering the combustion exhaust gases prior to releasing the combustion exhaust gases into the environment.

In another embodiment, the calcium oxide may be formed as a result of combustion of calcium carbonate present in mixture 102. During combustion, calcium carbonate reacts with carbon associated with the waste to produce calcium carbide and carbon monoxide. The carbon monoxide then burns in air to form carbon dioxide. This is an exothermic reaction and the heat produced by this reaction may be used to maintain the temperature of molten metal bath 106 thereby the molten metal remains in the molten state. The calcium carbide is removed from apparatus 100 through the access hole and is mixed with water to produce acetylene gas and calcium hydroxide. The calcium hydroxide is then fed back into apparatus 100 where the calcium hydroxide disassociates at a temperature ranging between 450° C. and 600° C. to produce calcium oxide and water. In an embodiment, calcium hydroxide disassociates at a temperature of 512° C. to produce calcium oxide and water. Further, in an embodiment, the acetylene gas may be injected into apparatus 100 through one or more air nozzles and burnt in air to produce heat. This heat is then used to maintain the temperature of molten metal bath 106.

Figure 2:
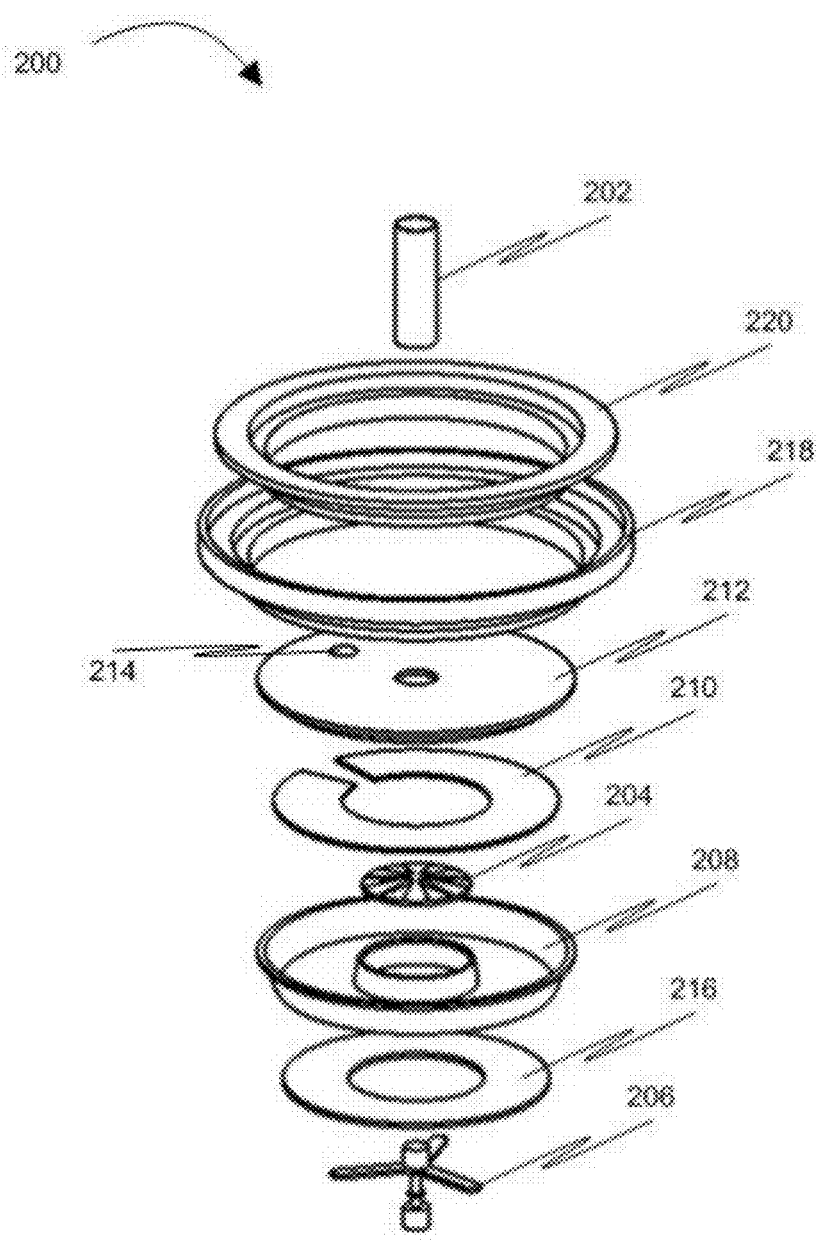
FIG. 2 illustrates an exploded view of an apparatus for incinerating waste in accordance with an exemplary embodiment of the invention.
Figure 3:
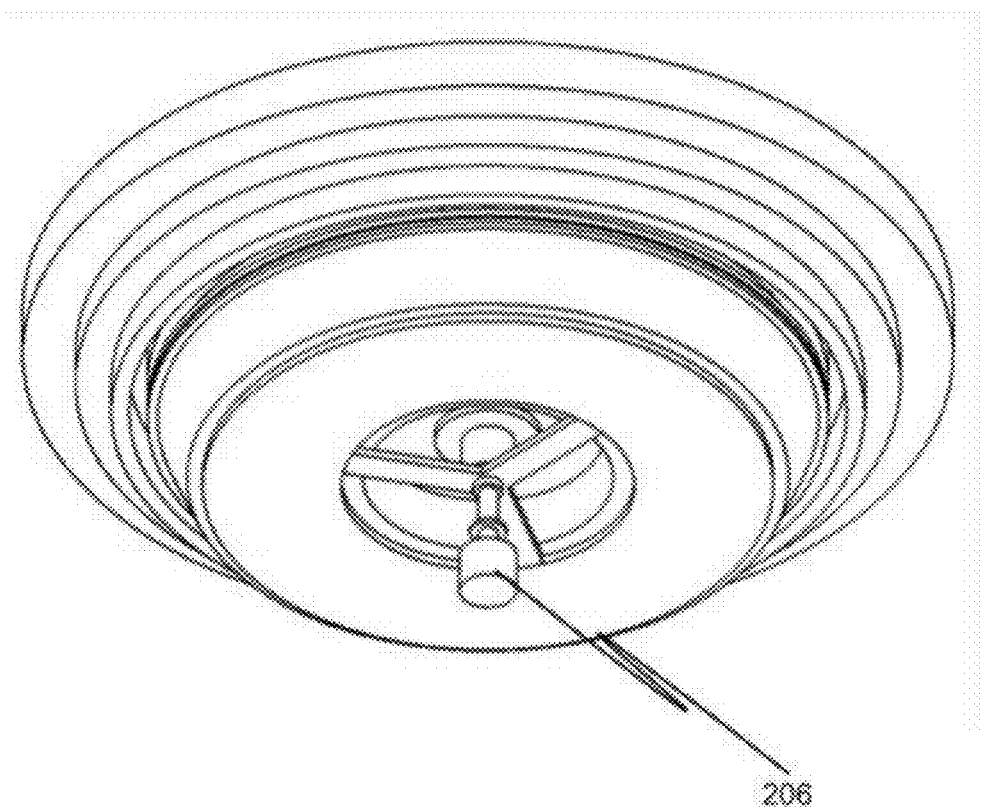
FIG. 3 illustrates a bottom perspective view of the apparatus showing an arrangement of a motor to grind a mixture of the waste and the calcium carbonate in accordance with an exemplary embodiment of the invention.
Figure 4:
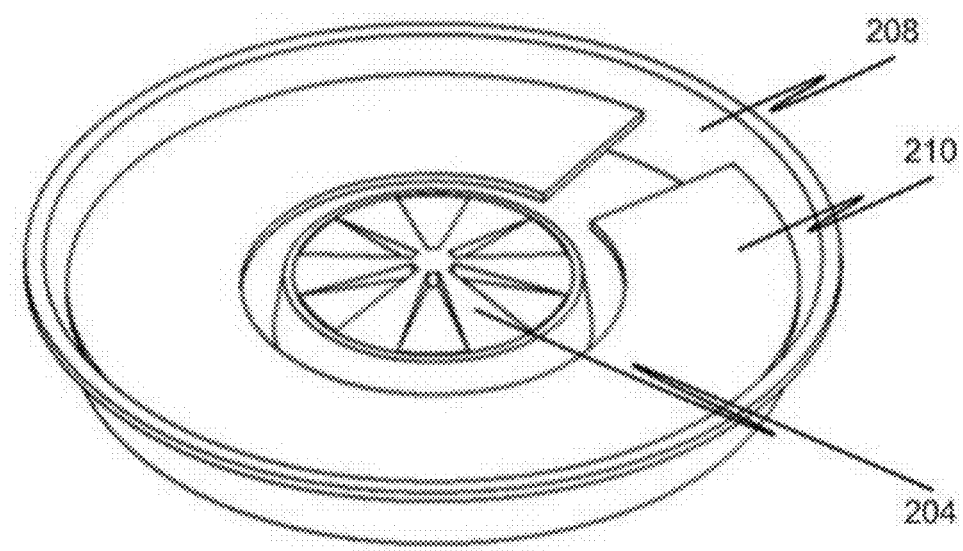
FIG. 4 illustrates an arrangement of a grinder, a heating member and a crucible in accordance with an exemplary embodiment of the invention.

FIG. 2 illustrates an exploded view of an apparatus 200 for incinerating waste in accordance with an exemplary embodiment of the invention. Apparatus 200 includes a feed inlet 202 for guiding a mixture of the waste and calcium carbonate to a grinder 204. Grinder 204 then grinds the mixture of the waste and the calcium carbonate to reduce the size of the particles of the mixture. Grinder 204 is driven by one or more motors such as, motor 206 to grind the mixture of the waste and the calcium carbonate as illustrated in FIG. 3. Grinder 204 may be spinning grinder or any grinder known in the art. A centrifugal force generated due to the rotation of grinder 204 results in the mixture of the waste and the calcium carbonate being fed into a molten metal bath present within a crucible 208. Grinder 204 may be placed substantially above the molten metal bath present within crucible 208 as illustrated in FIG. 4. Grinding the mixture of the waste and the calcium carbonate results in increase in the surface area of the waste to facilitate efficient incineration. Moreover, since grinder 204 is placed substantially above the molten metal bath present within crucible 208, excess moisture present in the waste is removed by the heat dissipated from the molten metal bath during the grinding process.

On grinding the mixture of the waste and the calcium carbonate, the mixture is fed into the molten metal bath present within crucible 208. Thereafter, the mixture of the waste and the calcium carbonate is combusted by supplying heat using a heating member 210. This is explained in detail in conjunction with FIG. 1. Heating member 210 may be placed on the bottom surface of an upper cover 212.

The combustion of the mixture of the waste and the calcium carbonate produces one or more of slag and one or more acidic gases as explained in conjunction with FIG. 1. Any high melting point metals present in the waste is collected in the molten metal bath and may be removed from time to time through one or more access holes such as, an access hole 214. In an embodiment, the one or more access holes may be opened and thereafter, the one or more high melting point metals may be scooped out periodically. In another embodiment, the one or more high melting point metals may be drained from a bottom spout (not shown in FIG. 1) present in apparatus 200. Further, low melting point metals present in the waste may evaporate from crucible 208 and may be collected separately from the high melting point metals as explained in conjunction with FIG. 1. Additionally, one or more of metal compounds, calcium compounds, and potassium compounds formed as a result of combusting the mixture of the waste and the calcium carbonate may be removed in the form of slag through access hole 214. The metal compounds may include, but are not limited to, iron nitrate and iron phosphate. Further, the calcium compounds may include, but are not limited to calcium nitrate and calcium phosphate. The process of forming one or more of the metal compounds, the calcium compounds, and the potassium compounds is explained in conjunction with FIG. 1.

Due to incomplete combustion of the mixture of the waste and the calcium carbonate, unburned carbon particles may be formed. These unburned carbon particles may settle in the molten metal bath. In such a scenario, the molten metal bath may be stirred by a stirrer 216 to enable unburned carbon particles from the mixture of the waste and the calcium carbonate to melt in molten metal bath 106. Stirrer 216 may include, but is not limited to, a mechanical stirrer and a magnetic stirrer. Stirrer 216 may be configured at the bottom of apparatus 200 as illustrated in FIG. 3. The molten metal bath may be stirred by rotating stirrer 216. Stirrer 216 may be operated using one or more motors such as, motor 206. It will apparent to person skilled in the art that stirrer 216 may be operated using any other motors present within apparatus 200. Considering the case of a mechanical stirrer, the mechanical stirrer may rotated using any arrangements to facilitate stirring of the molten metal bath. In an embodiment, the mechanical stirrer may include blades that may enable stirring of the molten metal bath.

Whereas, in case of a magnetic stirrer, a magnetic field created by the magnetic stirrer is continuously changed due to rotation of the magnetic stirrer. This change in the magnetic field results in stirring of the molten metal bath. The magnetic field then penetrates through a wall of the apparatus to stir the molten metal. In an embodiment, the magnetic stirrer may include a magnet rotating to create the magnetic field. Alternatively, the magnetic stirrer may be a fixed magnet that generates a rotating magnetic field. In an alternate embodiment, an apparatus such as, apparatus 100 or apparatus 200 may include a mechanical stirrer and a magnetic stirrer for stirring the molten metal bath. Stirring of the molten metal bath using stirrer 216 facilitates the unburned carbon particles from the waste to melt in the molten metal bath. These unburned carbon particles then leave the molten metal bath as carbon dioxide in response to heating the molten metal bath to a high temperature. The carbon particles extract oxygen from the metal oxide associated with the slag layer to form carbon dioxide. Subsequent oxidation of the metal in the molten metal bath produces significant thermal energy thereby enabling the metal to remain in the molten state. For example, steel present in the molten metal bath may dissolve carbon and the dissolved carbon may remove the oxygen from iron oxide present in the molten metal bath to form carbon dioxide. Thus, iron may be formed that can oxidize in a rapid fashion at a high temperature. As a result, high thermal energy is generated that maintains the iron in the molten state.

Combustion exhaust gases formed as result of combustion of the mixture of the waste and the calcium carbonate are cooled by one or more of a heat exchanger 218 and an insulator 220 before exiting from apparatus 200. In an embodiment, insulator 220 may be replaced by a heat exchanger to ensure further cooling of the combustion exhaust gases. In an embodiment, heat exchanger 218 may be filled with distilled boiler grade water. The distilled boiler grade water may absorb the heat from the exhaust combustion gases and boils out into steam. This steam may be then used to run a turbine to generate electricity. In another embodiment, heat exchanger 218 may be filled with any cooling fluid such as, coolants that facilitate cooling of the steam.

Alternatively, the combustion exhaust gases may be fed through one or more air inlets to heating member 210 to produce heat. Thus, by reusing the hot combustion exhaust gases to generate heat, power consumption required for operating heating member 210 may be reduced. Apparatus 200 may also include one or more water scrubbers (not shown in FIG. 1) for filtering the combustion exhaust gases prior to releasing the combustion exhaust gases into the environment.

Figure 5:
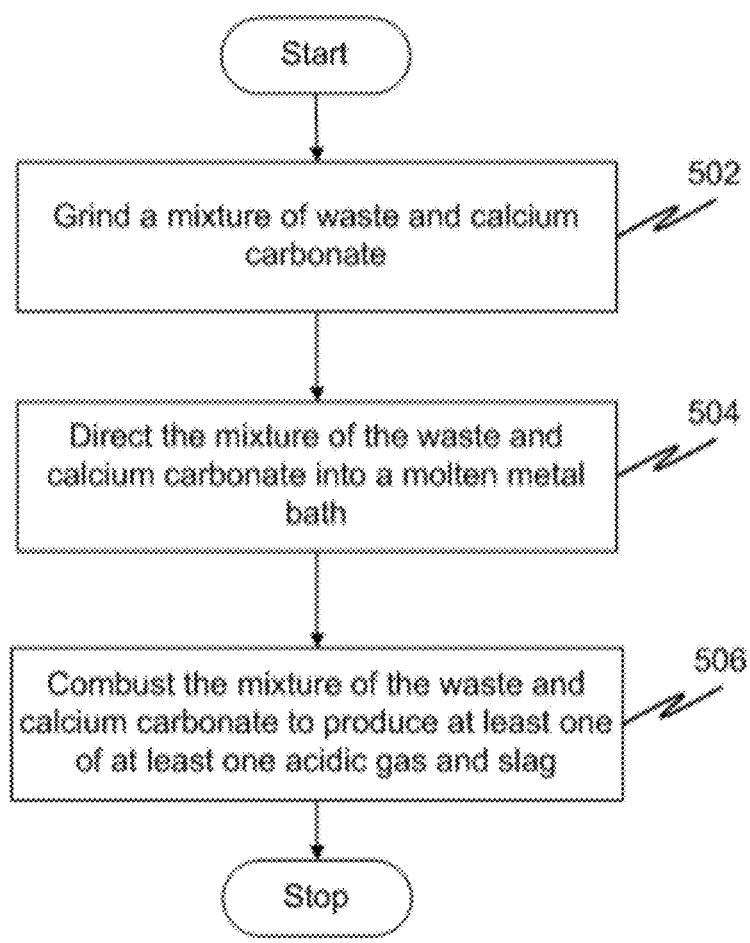
FIG. 5 illustrates a flowchart of a method of incinerating waste in accordance with an embodiment of the invention.

FIG. 5 illustrates a method of incinerating waste in accordance with an embodiment of the invention. The waste may be one or more of an organic waste and an inorganic waste. For example, the waste may include one or more of a human waste, an animal waste, a plant waste, and a plastic waste. The human waste, the animal waste and the plant waste may include moisture, carbohydrates and other organic materials along with elements such as, nitrogen and phosphorous. The plastic waste may include moisture, hydrocarbons and other elements.

At step 502, a mixture of the waste and calcium carbonate is ground to break the mixture of the waste and calcium carbonate into particles of smaller size. The size of the particles may be reduced in order to increase the surface area of the mixture of the waste and the calcium carbonate to enable efficient incineration of the mixture. On grinding the mixture of the waste and the calcium carbonate, the mixture is directed to a molten metal bath present within a crucible at step 504. The molten metal bath may include, but is not limited to, one of molten steel and molten iron. This is explained in detail in conjunction with FIG. 1 and FIG. 2. Once the mixture is received in the crucible, the mixture of the waste and the calcium carbonate is combusted by supplying heat at step 506.

In response to the combustion, one or more of one or more acidic gas and slag are produced. The slag includes calcium oxide formed as a result of combustion of the calcium carbonate. This calcium oxide reacts with moisture present in the waste to form calcium hydroxide. Thereafter, one or more of the molten metal bath and the calcium hydroxide neutralize the one or more acidic gases as explained in conjunction with FIG. 1. In addition to neutralizing the one or more acidic gases, the one or more of the molten metal bath and the calcium hydroxide facilitates generation of metal compounds usable as fertilizers in response to reacting with the at least one acidic gas. This is explained in detail in conjunction with FIG. 1.

Further, the combustion of the mixture of the waste and the calcium carbonate may produce one or more of one or more high melting point metals, one or more low melting point metals, and one or more combustion exhaust gases depending on the composition of the waste. Thereafter, the one or more of one or more high melting point metals, one or more low melting point metals, and one or more combustion exhaust gases are separated and processed as explained in conjunction with FIG. 1. The one or more high melting point metals may be collected in the molten metal bath. The one or more high melting point metals may include metals having a melting point substantially higher than the melting point of the metal in the molten metal bath. The one or more high melting point metals may include, but are not limited to, copper, lead and zinc. These metals remain in the solid form and are collected in the molten metal bath.

The one or more low melting point metals present in the waste may evaporate from crucible. This process of evaporation of the one or more low melting point metals may occur in response to maintaining the temperature within the crucible substantially higher than the boiling point of the one or more low melting point metals. These metals may have a boiling point substantially lower than that of the metal in the molten metal bath. The one or more low melting point metals are then removed from the crucible in the gaseous form through one or more outlets. Thereafter, the one or more low melting point metals are condensed to form condensed low melting point metals. This is explained in conjunction with FIG. 1.

During combustion of the mixture of the waste and the calcium carbonate, unburned carbon particles may be formed. These unburned carbon particles present in the molten metal bath may be converted into carbon dioxide by stirring the molten metal bath such that the carbon melts in the molten metal bath. In this case, the unburned carbon particles extract oxygen from metal oxide associated with the slag layer and are removed as carbon dioxide when heated to a high temperature. Further, the one or more combustion gases formed after the combustion of the mixture of the waste and the calcium carbonate, may be in an heat exchanging relationship with a heat exchanger. Thus, heat energy present within the one or more combustion gases may be transferred to the heat exchanger prior to removal of the one or more combustion gases. This is explained in detail in conjunction with FIG. 1.

Various embodiments of this disclosure provide a method and apparatus for incinerating waste, wherein the waste is one or more of an organic waste and an inorganic waste. One or more acidic gases that are corrosive are produced in response to combusting the waste. These acidic gases are neutralized thereby preventing corrosion of the apparatus. Further, the apparatus is compact and may handle variations in the composition of the waste. Further, the metals associated with the waste are separately collected and processed. The heat extracted from hot combustion gases is used to run a turbine and produce electricity. Alternatively, the hot combustion gases may be used to supply heat to combust the waste.

Those skilled in the art will realize that the above recognized advantages and other advantages described herein are merely exemplary and are not meant to be a complete rendering of all of the advantages of the various embodiments of this disclosure.

In the foregoing specification, specific embodiments of this disclosure have been described. However, one of ordinary skill in the art appreciates that various modifications and changes can be made without departing from the scope of this disclosure as set forth in the claims below. Accordingly, the specification and figures are to be regarded in an illustrative rather than a restrictive sense, and all such modifications are intended to be included within the scope of this disclosure. The benefits, advantages, solutions to problems, and any element(s) that may cause any benefit, advantage, or solution to occur or become more pronounced are not to be construed as a critical, required, or essential features or elements of any or all the claims. This disclosure is defined solely by the appended claims including any amendments made during the pendency of this application and all equivalents of those claims as issued.

What is claimed is:

1. A compact conic apparatus for incinerating waste to make fertilizer, the apparatus comprising:
    a spinning centrifugal waste grinder for grinding a waste mixture of the waste with calcium carbonate and for centrifugally distributing the ground waste mixture;
    a crucible coaxial with the spinning centrifugal waster grinder and removably attached below the spinning centrifugal waster grinder;
    a crucible cover concentric with the crucible;
    a combustion chamber between the crucible and the crucible cover for oxidizing the waste mixture from the waste grinder, the combustion chamber including a molten metal bath;
    a heating member attached to the bottom of the crucible cover and configured proximal to the molten metal bath for combusting the mixture of the waste and the calcium carbonate to produce at least one of at least one acidic gas and a slag, the slag comprising calcium oxide, wherein the calcium oxide reacts with moisture present in the waste to produce calcium hydroxide, wherein at least one of the molten metal and the calcium hydroxide neutralizes the at least one acidic gas to prevent corrosion of the apparatus and generates metal compounds usable as fertilizers, wherein the heating member facilitates combustion at a temperature ranging between a melting point of a metal in the molten metal bath and a boiling point of the metal in the molten metal bath;
    at least one heat exchanger coaxial with the spinning centrifugal waste grinder and coaxial with the crucible; and
    an insulator concentric with the at least one heat exchanger.

2. The apparatus of claim 1, wherein the waste is at least one of an organic waste and an inorganic waste.

3. The apparatus of claim 1, wherein an amount of moisture present in the waste mixture is reduced using the heat generated by the molten metal bath.

4. The apparatus of claim 1 further comprising a feed inlet for guiding the waste mixture of the waste and the calcium carbonate into the waste grinder.

5. The apparatus of claim 1, wherein the molten metal comprises at least one of molten steel and molten iron.

6. The apparatus of claim 1 further comprising at least one air inlet for allowing air into the apparatus.

7. The apparatus of claim 1, wherein combusting the mixture of the waste and the calcium carbonate further produces at least one of at least one high melting point metal, at least one low melting point metal, and at least one combustion exhaust gas.

8. The apparatus of claim 7 further comprising at least one outlet for allowing at least one of the at least one combustion exhaust gas and the at least one low melting point metal to exit from the apparatus.

9. The apparatus of claim 8, wherein the at least one heat exchanger is connected to the at least one outlet, the at least one heat exchanger capable of extracting heat energy from the at least one combustion exhaust gas prior to exiting from the apparatus thereby preventing the formation of dioxins from the at least one combustion gas.

10. The apparatus of claim 7 further comprising a low melting point metal bath to collect the at least one low melting point metal.

11. The apparatus of claim 7 further comprising at least one stirrer for stirring the molten metal bath, wherein unburned carbon particles obtained by the combustion of the mixture of the waste and the calcium carbonate are removed in the form of the at least one combustion exhaust gas from the molten metal bath in response to stirring the molten metal bath.

12. The apparatus of claim 1 further comprising at least one access hole to remove at least one of excess molten metal and excess slag.

* * * * *